United States Patent
Pentland

(10) Patent No.: US 12,115,552 B2
(45) Date of Patent: Oct. 15, 2024

(54) COLLAR FOR USE WITH A CASING AND AN APPLICATOR

(71) Applicant: Ingersoll Products Inc., Ingersoll (CA)

(72) Inventor: James Pentland, London (CA)

(73) Assignee: Ingersoll Products Inc. (CA)

( * ) Notice: Subject to any disclaimer, the term of this patent is extended or adjusted under 35 U.S.C. 154(b) by 624 days.

(21) Appl. No.: 17/271,519

(22) PCT Filed: Aug. 27, 2019

(86) PCT No.: PCT/CA2019/051173
§ 371 (c)(1),
(2) Date: Feb. 25, 2021

(87) PCT Pub. No.: WO2020/041866
PCT Pub. Date: Mar. 5, 2020

(65) Prior Publication Data
US 2021/0308714 A1    Oct. 7, 2021

Related U.S. Application Data

(60) Provisional application No. 62/724,295, filed on Aug. 29, 2018.

(51) Int. Cl.
*B05C 17/005* (2006.01)
*F16L 19/00* (2006.01)

(52) U.S. Cl.
CPC .. *B05C 17/00513* (2013.01); *B05C 17/00583* (2013.01); *F16L 19/005* (2013.01)

(58) Field of Classification Search
CPC ........ B05C 17/00513; B05C 17/00583; B05C 17/00586; F16L 19/005
(Continued)

(56) References Cited

U.S. PATENT DOCUMENTS 4,150,845 A * 4/1979 Riuli .................. F16L 47/04
285/388
4,284,213 A   8/1981 Lee
(Continued)

FOREIGN PATENT DOCUMENTS

| DE | 102010030402 A1 | 12/2011 |
| FR | 2273722 | 1/1976 |
| WO | 2004026707 A1 | 4/2004 |

OTHER PUBLICATIONS

International Search Report and Written Opinion for corresponding PCT Application No. PCT/CA2019/051173, mailed Sep. 25, 2019.
(Continued)

*Primary Examiner* — James M Hewitt, II
(74) *Attorney, Agent, or Firm* — Emerson, Thomson & Bennett, LLC; Roger D. Emerson; Matt J. Wilson

(57) ABSTRACT

A collar and method are provided for coupling a casing with an applicator. The collar comprising: a body having a first end, a second end and an external surface extending therebetween; a bore extending through the body, the bore having an upper bore portion adjacent the first end for releasable engagement with the attachment portion of the applicator, and a lower bore portion adjacent the second end for securing to the casing; an internal partition extending radially into the body between the upper bore portion from the lower bore portion, and a sealing ridge connected to the partition adjacent the upper bore portion, the sealing ridge adapted to contact the attachment portion of the applicator to form a seal.

10 Claims, 7 Drawing Sheets

(58) Field of Classification Search
USPC ...... 285/2–4, 92, 355, 382–382.7, 383, 390; 222/153.07, 541.9
See application file for complete search history.

(56) References Cited

U.S. PATENT DOCUMENTS

| | | | | |
|---|---|---|---|---|
| 4,711,363 | A * | 12/1987 | Marino | B65D 47/0847 |
| | | | | 220/834 |
| 4,760,941 | A * | 8/1988 | Salmon | B65D 51/225 |
| | | | | 222/153.07 |
| 5,531,363 | A * | 7/1996 | Gross | B65D 47/2031 |
| | | | | 222/541.9 |
| 5,746,454 | A * | 5/1998 | Webb | F16L 19/005 |
| | | | | 285/354 |
| 6,223,941 | B1 * | 5/2001 | Nealey | B05C 17/015 |
| | | | | 222/105 |
| 9,968,771 | B2 * | 5/2018 | Wong | A61J 1/2096 |
| 2002/0030067 | A1 | 3/2002 | Frutin | |
| 2003/0021178 | A1 | 1/2003 | Hagel et al. | |
| 2004/0226968 | A1 | 11/2004 | Afond | |
| 2018/0116244 | A1 * | 5/2018 | Takakuta | B05C 17/00583 |

OTHER PUBLICATIONS

International Preliminary Report on Patentability for corresponding PCT Application No. PCT/CA2019/051173, mailed Sep. 25, 2019.

\* cited by examiner

COLLAR FOR USE WITH A CASING AND AN APPLICATOR

CROSS-REFERENCE TO A RELATED APPLICATION

The application claims all benefit including priority to U.S. Provisional Patent Application No. 62/724,295, filed on Aug. 29, 2018, the contents of which are incorporated herein by reference.

FIELD

The present invention relates to the field of applicators for dispensing viscous materials from tubes, casings, sleeves, cartridges or other types of casings.

BACKGROUND

Caulking, adhesives, silicone, drywall compound, spackle, plaster, and other such materials are often sold in tubes, canisters, cartridges, and other such casings. When sold in such manners, these types of materials are typically dispensed through the application of pressure to the casing or casing, forcing the viscous or semi-viscous material through a nozzle at one end. Where the material in question is contained within a flexible tubular casing, one end may be sealed such that applying pressure to the exterior circumference of the casing causes the material to be extruded through a nozzle at the opposite end, much like in the case of a tube of toothpaste.

Commonly, the nozzles through which viscous or semi-viscous materials are extruded are releasably coupled to the tube or casing through use of a nozzle receiving structure often referred to as a collar. The collar is glued or otherwise secured to an end or portion of the casing such that the collar acts as a receiver for the releasable attachment of the nozzle. When joined together in this manner, the viscous or semi-viscous contents of the casing can flow out of the casing, through the collar, into the nozzle, and subsequently be extruded.

While existing collars have been effective, at times a portion of the viscous or semi-viscous material that flows into the collar may creep into small interior gaps or spaces between the collar and the nozzle or applicator. In such circumstances, it can become more difficult and time consuming to clean the nozzle and/or the collar after use. Should the viscous or semi-viscous material harden, it may also become difficult to remove the nozzle or applicator from the collar. As such, there can be a waste of material. The challenges to clean the collar and the nozzle may also limit them to a single use. In some instances, a creeping of material into internal gaps, and a subsequent hardening of that material may also prevent the removal of the nozzle. Should the nozzle become fixed in place, the ability to utilize different nozzles will be lost as will the potential range of applications of the overall product.

SUMMARY

In one aspect the invention there is provided a collar for coupling a casing and an applicator, the collar comprising: a body having a first end, a second end and an external surface extending therebetween; a bore extending through the body, the bore having an upper bore portion adjacent the first end for releasable engagement with the attachment portion of the applicator, and a lower bore portion adjacent the second end for securing to the casing; an internal partition extending radially into the body between the upper bore portion from the lower bore portion, and a sealing ridge connected to the partition adjacent the upper bore portion, the sealing ridge adapted to contact the attachment portion of the applicator to form a seal.

In another aspect, there is provided a method for coupling an applicator to a casing using a collar, the collar including a body, a bore extending through the body and having an internal partition separating an upper bore portion from a lower bore portion, and a sealing ridge connected to the partition adjacent the upper bore portion, the method comprising: coupling the applicator with the upper bore portion, and bringing the applicator into contact with the sealing ridge and creating a liquid-tight seal therebetween.

BRIEF DESCRIPTION OF THE DRAWINGS

For a better understanding of the present invention, and to show more clearly how it may be carried into effect, reference will now be made, by way of example, to the accompanying drawings which show exemplary embodiments of the present invention in which.

DESCRIPTION

Figure 1:
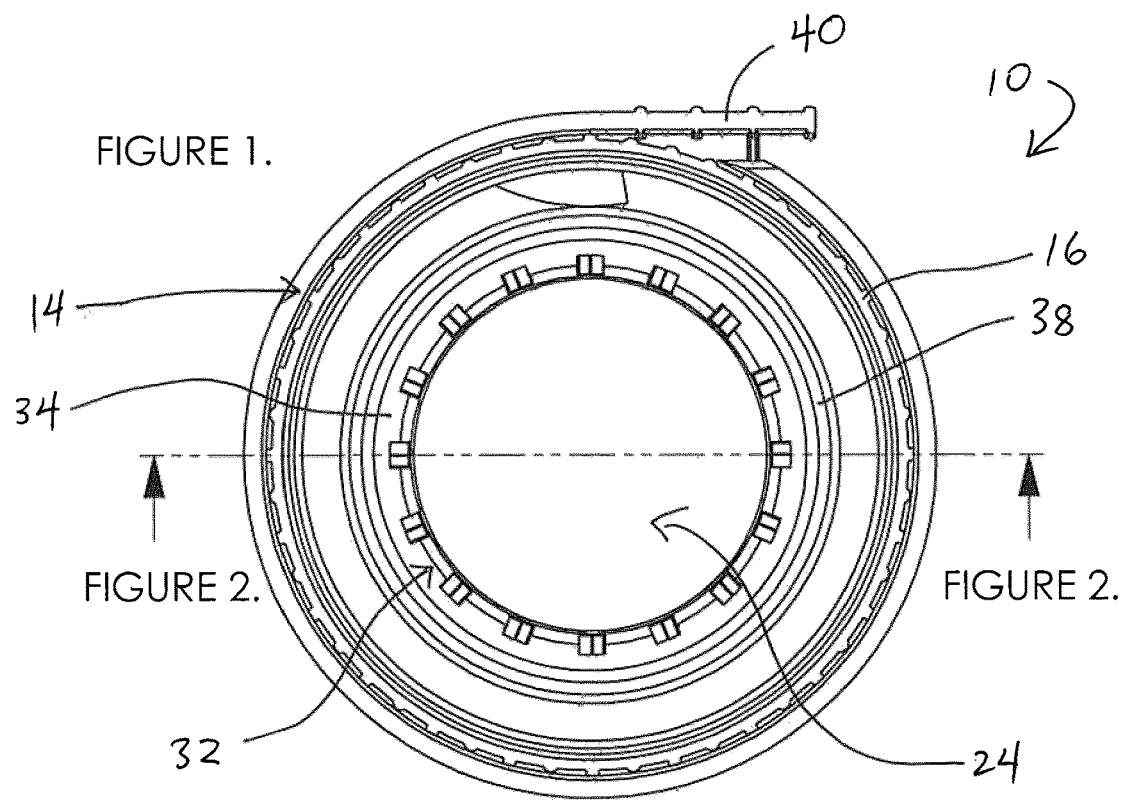
FIG. 1 is a plan view of a collar in accordance with an embodiment of the invention.

The present invention may be embodied in a number of different forms. The specification and drawings that follow describe and disclose some of the specific forms of the invention.

The Figures show a collar 10 for use with a canister or casing 110 and an applicator 100. Applicator 100 will typically have an annular base 102 and an attachment portion 104 extending from annular base 102 to a bottom edge 106. Casing 110 may be a flexible casing containing viscous material.

In the particular embodiment shown, collar 10 has a body 12, and a spacer 14 frangibly secured to body 12. Body 12 will typically be cylindrical and include a first end 16, a second end 18 and an external surface 20 extending between first end 16 and second end 18 (see FIGS. 2 and 3). External surface 20 of body 12 could include ridges to enhance gripping of body 12. The particular irregularities shown in the Figures are ribs 22 which are generally vertical, extending from first end 16 to second end 18 of body 12. As would be understood by the skilled person, the external surface irregularities may take on different shapes, sizes and/or textures, so long as they are visible to the user and enhance the user's grip of body 12. When collar 10 is coupled with casing 110 which has already been opened or punctured, the visibility of ribs 22 may help to indicate or encourage the user to grip body 12 when coupling applicator 100 to collar 10, rather than to grip the opened casing. This helps to prevent unintentional extruding of viscous material from casing 110 prematurely before applicator 100 is secured in place.

A bore 24 extends through body 12. Bore 24 has an upper bore portion 26 adjacent first end 16 for releasable engagement with attachment portion 104 of applicator 100. Upper bore portion 26, in the embodiment shown, includes internal threads 28. Internal threads 28 engage with external threads 108 on attachment portion 104 to releasably secure applicator 100 to collar 10. Alternatively, upper bore portion 26 and attachment portion 104 may have corresponding snap-fit components which engage with one another to hold the applicator in place. Other components which releasably interlock upper bore portion 26 with attachment portion 104 may also be used.

Bore 24 further includes a lower bore portion 30 positioned adjacent second end 18 for securing collar 10 to casing 110. For example, an adhesive may be applied within portion 30 to secure casing 110 to collar 10. Other manners by which casing 110 may be fixed to collar 10 may be used.

An internal partition 32 extends radially into body 12, between upper bore portion 26 and lower bore portion 30. As shown, partition 32 may be annular, extending generally perpendicular inside body 12. Partition 32 has an upper face 34 which is directed towards upper bore portion 26 and an opposed lower face 36 which is directed towards lower bore portion 30 (see FIG. 2).

Figure 2:
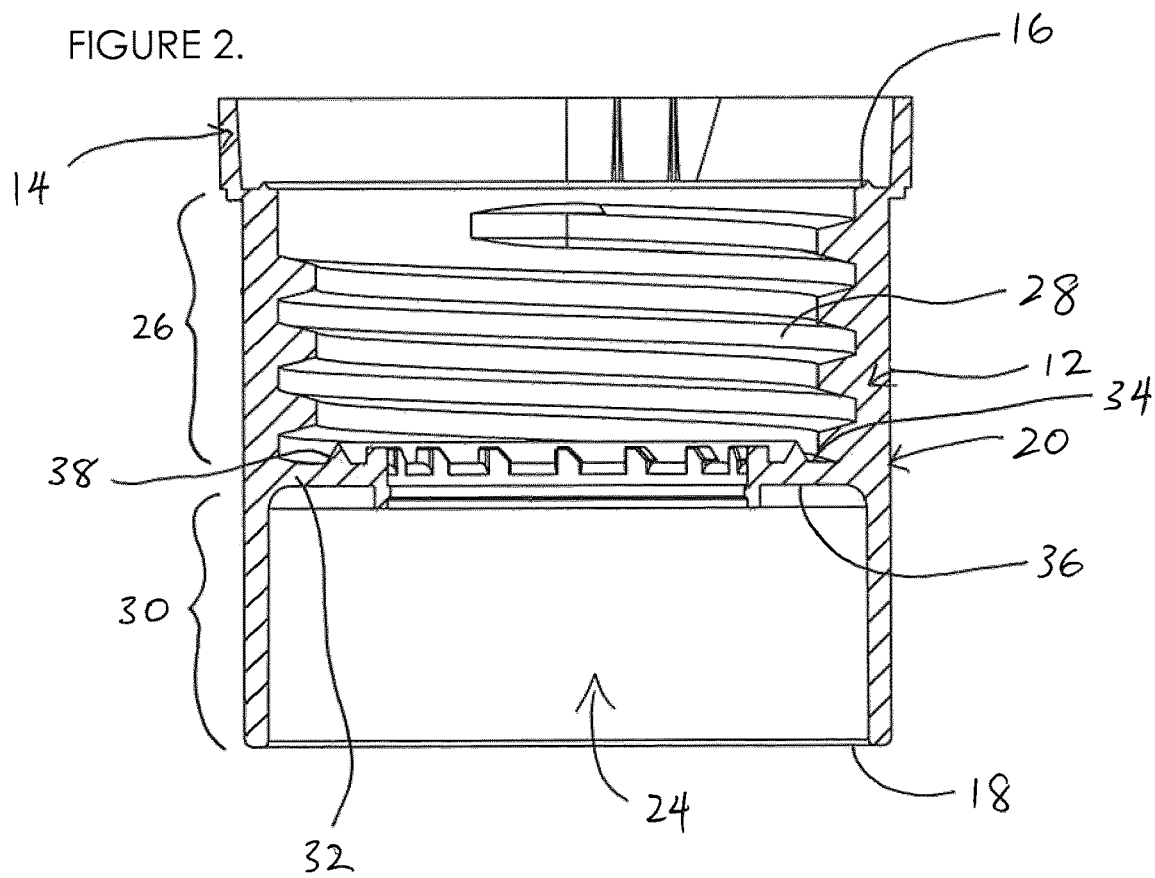
FIG. 2 is a sectional view taken along the line 2-2 of FIG. 1.
Figure 3:
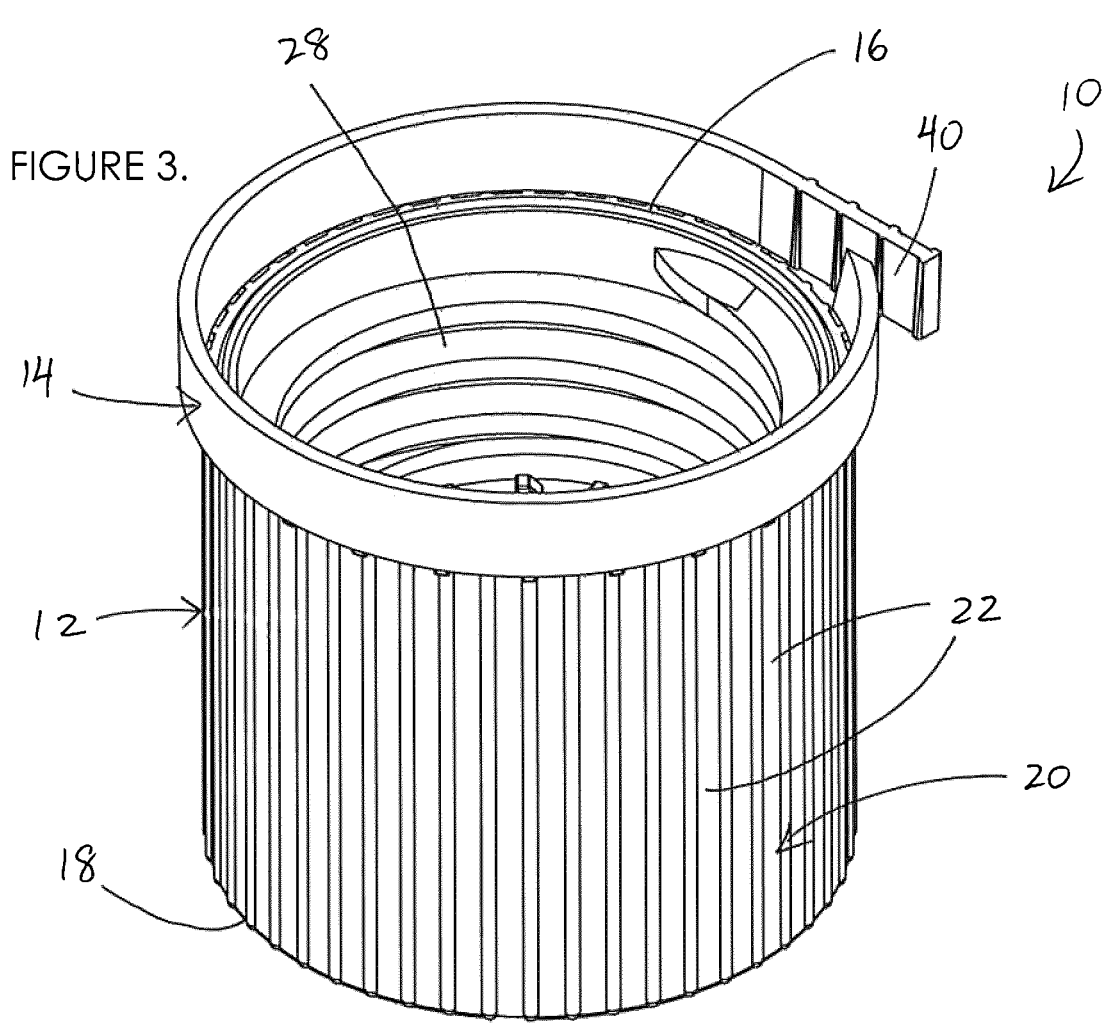
FIG. 3 is an upper side perspective view of the collar of FIG. 1.
Figure 4:
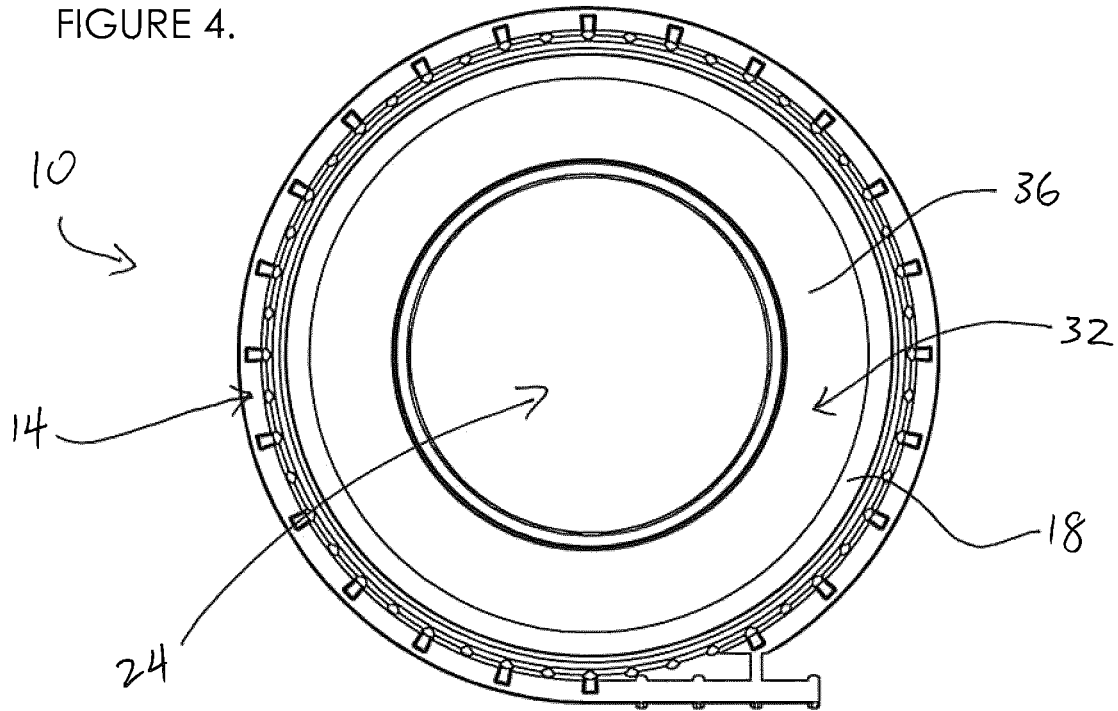
FIG. 4 is a bottom view of the collar of FIG. 1.

Collar 10 further includes a sealing ridge 38 which is positioned on upper face 34 of partition 32. In the depicted embodiment (as best seen in FIG. 2), sealing ridge 38 is formed with partition 32 and is of unitary construction. Sealing ridge 38 may have a generally triangular profile, with the apex of the triangle extending towards upper bore portion 26. Sealing ridge 38 is positioned and adapted to be in contact with bottom edge 106 of attachment portion 104 of applicator 100 to form a seal therebetween when applicator 100 is fully engaged with collar 10.

In an alternative embodiment, not shown, sealing ridge 38 may be formed as a separate unit from partition 32. And may be constructed from a different material, such as a resilient rubber-like material. The sealing ring may then be fixed or otherwise secured to upper face 34 of partition 32.

Collar 10 is depicted to further include a spacer 14 frangibly secured to first end 16 of body 12. Spacer 14 may include a tab 40 which a user can grip in order to separate spacer 14 from body 12.

Figure 5:
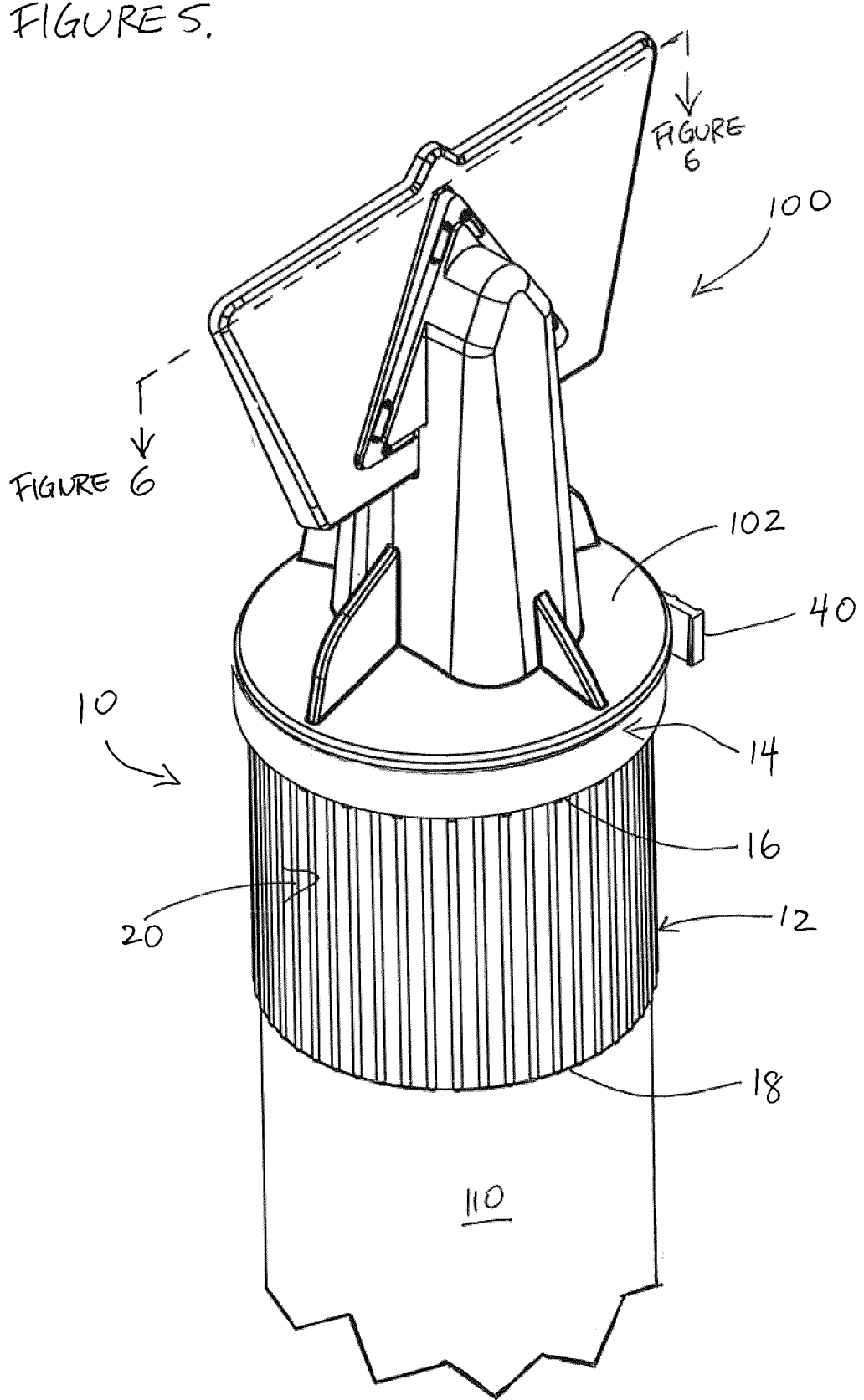
FIG. 5 is an upper side perspective view of the collar of FIG. 1 secured to the end of a casing or casing and having an applicator engaged therewith, the casing or casing remaining in a sealed condition.
Figure 6:
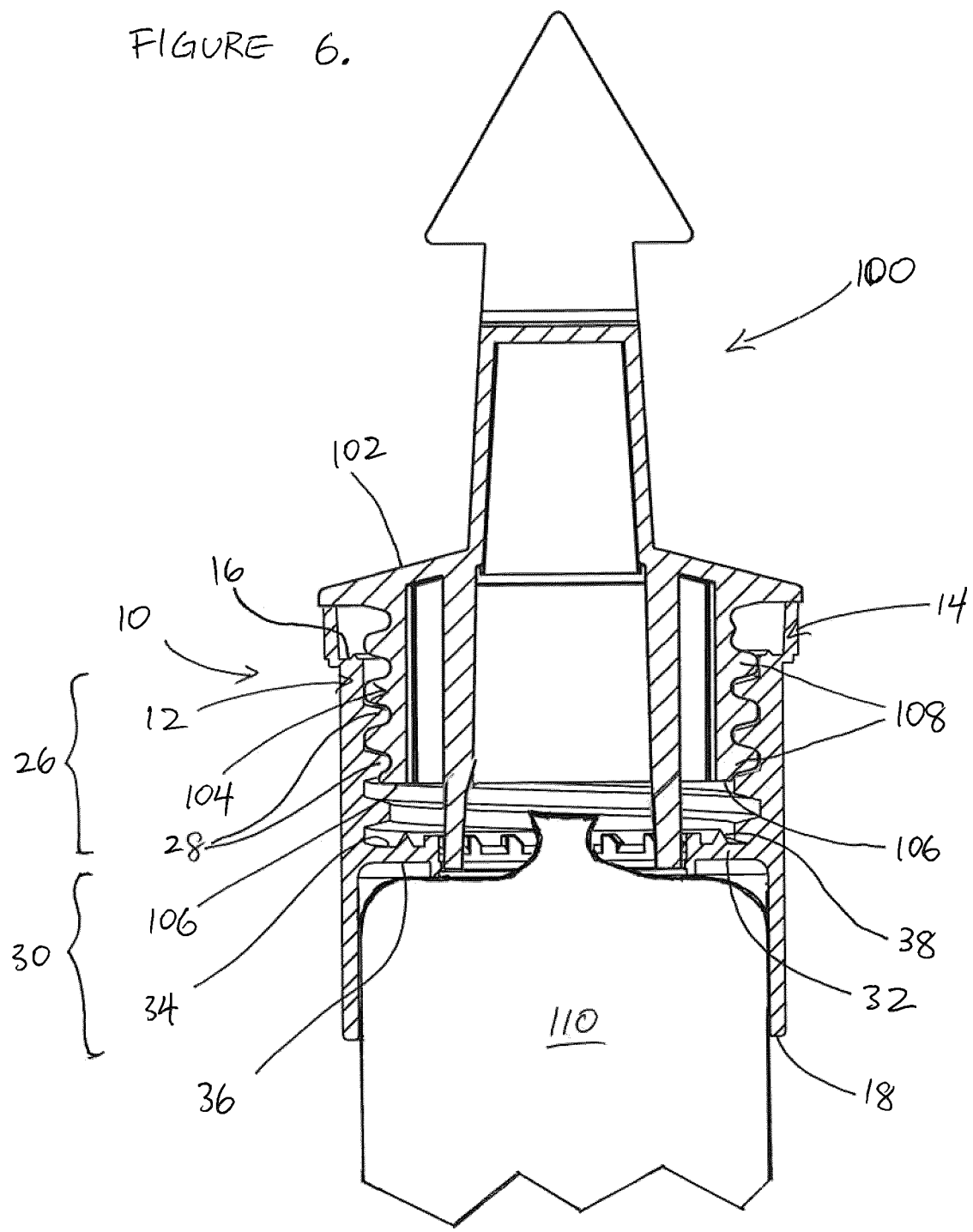
FIG. 6 is a sectional view taken along the line 6-6 of FIG. 5.

Referring to FIGS. 5 and 6, it will be noted that spacer 14 contacts annular base 102 of applicator 100 when attachment portion 104 is initially received within upper bore portion 26. The height of spacer 14 may be greater than the height of sealing ridge 38. In addition to preventing cutters from cutting into the casing, this height difference also helps to maintain a space between sealing ridge 38 and bottom edge 106 of attachment portion 104 when attachment portion 104 is coupled with collar 10. This space prevents the formation of a seal between sealing ridge 38 and bottom edge 106 of applicator 100 when spacer 14 is still attached to body 12.

Figure 7:
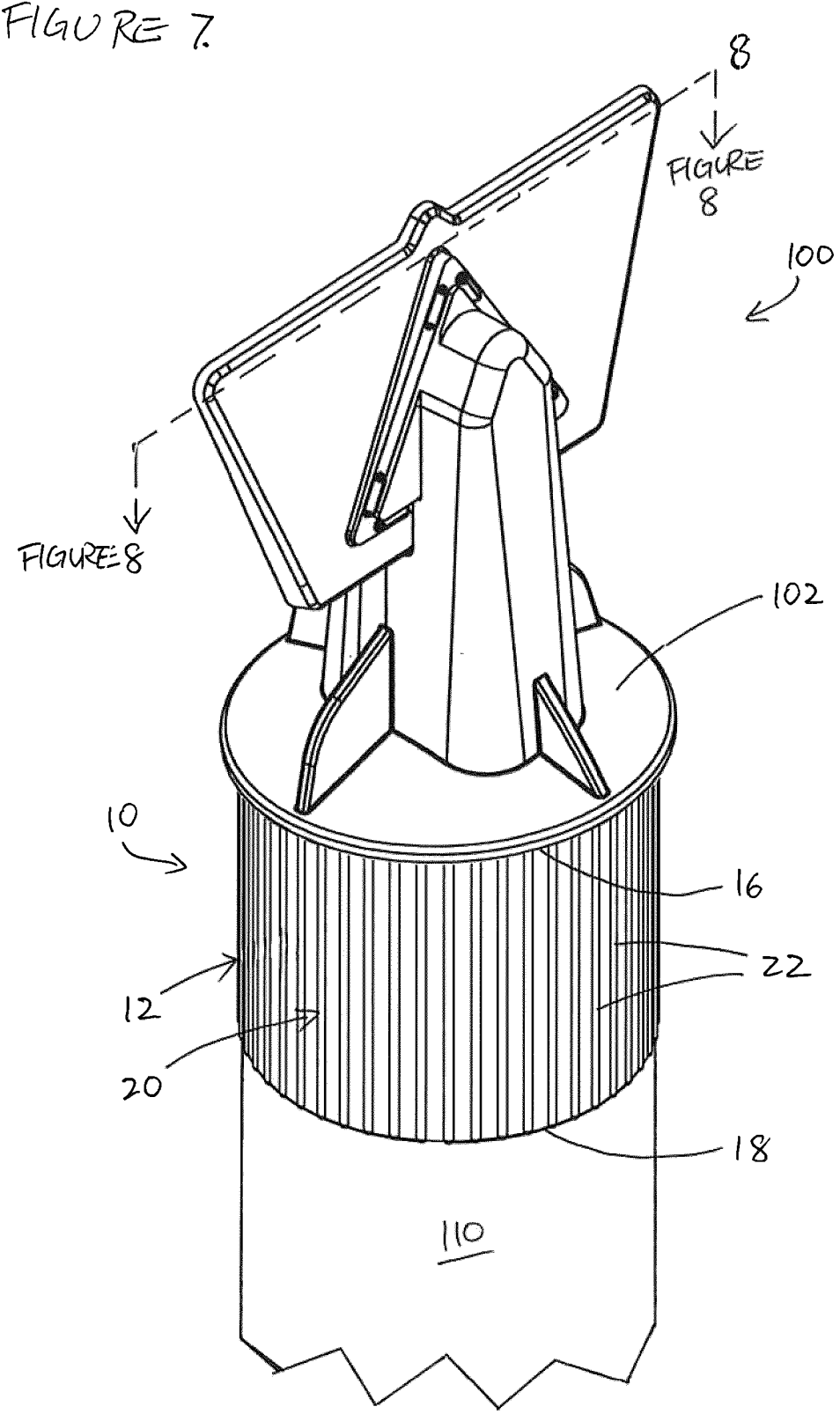
FIG. 7 is an upper perspective view of the collar of FIG. 1 coupled to an applicator with its spacer removed and with the applicator fully engaged with the collar such that the end of the casing is breached.
Figure 8:
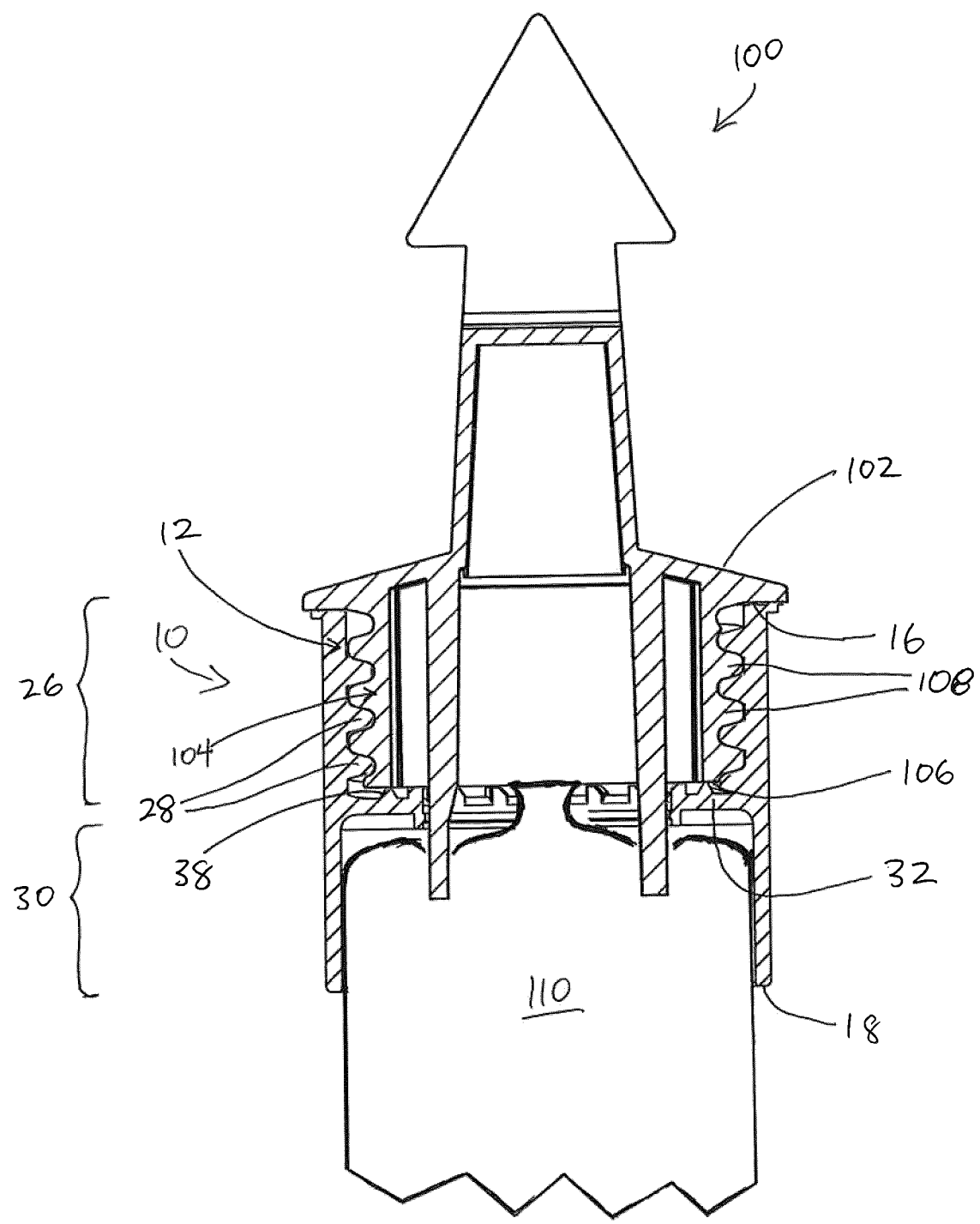
FIG. 8 is a sectional view taken along the line 8-8 of FIG. 7.

Referring now to FIGS. 7 and 8, collar 10 is shown with spacer 14 removed. In this regard, annular base 102 abuts with first end 16 of body 12 when attachment portion 104 is coupled within upper bore portion 26. As shown, the height of attachment portion 104 generally corresponds with that of upper bore portion 26. In this manner, when attachment portion 104 is coupled with upper bore portion 26, the cutters are brought into contact with the end of casing 110, cutting open casing 110 open. Further, sealing ridge 38 and bottom edge 106 meet and engage to form a seal. This seal helps to prevent viscous or semi-viscous material being extruded from casing 110 from entering the threaded area between attachment portion 104 and upper bore portion 26. This seal helps to reduce potential waste of material and helps to restrict flow of the material through the desired channels.

In an alternative embodiment, collar 10 may not include spacer 14.

Figure 9:
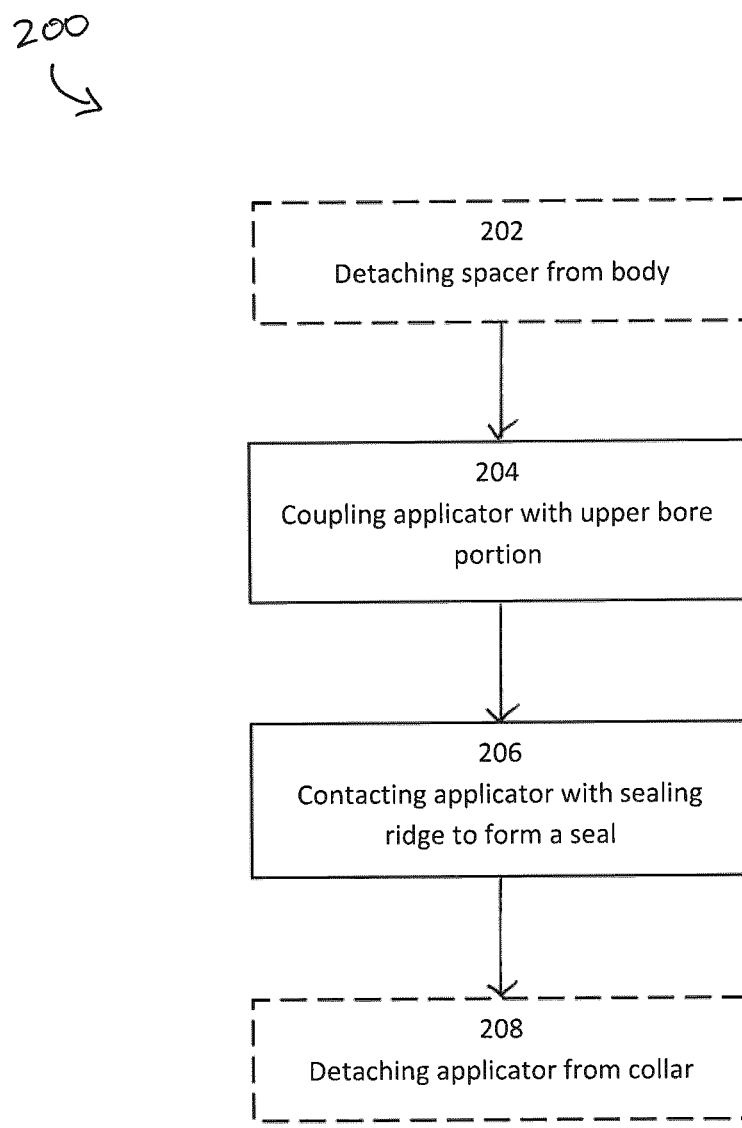
FIG. 9 is a flow chart of a method according to the present invention.

A method 200 for using collar 10, and specifically for coupling applicator 100 to casing 110 using collar 10, is embodied in FIG. 9. Where collar 10 includes spacer 14, at 202, method 200 involves detaching spacer 14 from body 12. For example, spacer 14 may be detached by the user pulling on tab 40. Where collar 10 does not include spacer 14, removing spacer 14 would understandably be unnecessary.

At 204, applicator 100 is coupled with upper bore portion 26. Applicator 100 may be coupled with upper bore portion 26 in a number of ways, including snap-fit engagement and a simple friction fit. In the present embodiment, applicator 100 includes external threads and upper bore portion 26 includes corresponding internal threads. In this manner, applicator 100 may be threadably engaged with upper bore portion 26.

At 206, the coupling of applicator 100 with upper bore portion 26 brings applicator 100 into contact with sealing ridge 38, thereby creating a liquid-tight seal therebetween. This seal helps to prevent the viscous or semi-viscous material in casing 110 from creeping into the small interior gaps or spaces between upper bore portion 26 of collar 10 and applicator 100.

Finally, at 208, after the material in casing 110 has been extruded through applicator 100 in the desired application, applicator 100 may optionally be removed from collar 10 with ease, since little to no viscous material has creeped into the threaded space between collar 10 and applicator 100.

It is to be understood that what has been described are the preferred embodiments of the invention. The scope of the claims should not be limited by the preferred embodiments set forth above, but should be given the broadest interpretation consistent with the description as a whole.

I claim:

1. A collar for coupling to a casing and to an applicator, the collar comprising:
   a body having;
   a first end, a second end and an external surface extending therebetween, the first end configured to receive an applicator, the second end configured to be received over an end of a casing containing a material to be dispensed;
   a bore extending through the body, the bore having an upper bore portion adjacent the first end and configured for releasable engagement with an attachment portion of the applicator, the bore having a lower bore portion adjacent the second end and configured for securing to the end of the casing;
   an internal partition extending radially into the body between the upper bore portion and the lower bore portion, the internal partition having an upper face directed toward the upper bore portion and an opposed lower face directed toward the lower bore portion, the partition having a centralized opening connecting the upper bore portion and the lower bore portion, the centralized opening configured to permit the flow of material to be dispensed from within the casing (a) through the centralized opening, (b) into the applicator, and (c) through a dispensing end of the applicator; and a sealing ridge positioned on the upper face of the internal partition and projecting into the upper bore portion in a direction away from the lower bore portion and a casing to be received therein, wherein the sealing ridge is configured to sealingly engage a bottom edge of the attachment portion of the applicator and to form a seal therewith when the applicator is fully engaged with the first end, thereby preventing material from within the casing from travelling between the attachment portion of the applicator and the first end of the body.

2. The collar of claim 1, wherein the sealing ridge and the internal partition are of unitary construction.

3. The collar of claim 2, wherein the sealing ridge has a generally triangular profile.

4. The collar of claim 1, wherein the sealing ridge is made of a resilient material and secured to the internal partition.

5. The collar of claim 1, further comprising a spacer frangibly secured to the first end of the body, the spacer positioned on the collar to be in contact with the annular base of the applicator when the attachment portion of the applicator is coupled with the upper bore portion of the collar.

6. The collar of claim 5, wherein the height of the spacer is greater than the height of the sealing ridge, thereby maintaining a space between the sealing ridge and the attachment portion of the applicator when the attachment portion is coupled with the upper bore portion.

7. The collar of claim 6, wherein the spacer includes a tab.

8. The collar of claim 1, wherein the external surface of the body includes irregularities to enhance gripping of the body.

9. The collar of claim 8, wherein the irregularities are ribs extending from the first end to the second end of the body.

10. The collar of claim 1, wherein the upper bore portion includes internal threads.

* * * * *